United States Patent [19]

Humpl et al.

[11] Patent Number: 5,018,502
[45] Date of Patent: May 28, 1991

[54] APPARATUS FOR THE DEGASSING OF FUEL

[75] Inventors: Josef Humpl, Hiendorf; Johann Konrad, Ingolstadt; Reinhold Sturm, Lenting; Johann Attenni, Wettstetten, all of Fed. Rep. of Germany

[73] Assignee: Audi AG, Fed. Rep. of Germany

[21] Appl. No.: 417,080

[22] Filed: Oct. 4, 1989

Related U.S. Application Data

[63] Continuation-in-part of Ser. No. 227,831, Aug. 3, 1988, abandoned.

[51] Int. Cl.[5] ............................................. F02M 37/04
[52] U.S. Cl. ................................... 123/514; 123/518; 123/509
[58] Field of Search ........ 123/516, 509, 514, 518–521; 137/199, 571, 576, 574

[56] References Cited

U.S. PATENT DOCUMENTS

| | | | |
|---|---|---|---|
| 3,606,908 | 9/1970 | Reister | 123/516 |
| 4,175,527 | 11/1979 | Sanada | 123/516 |
| 4,279,232 | 7/1981 | Schuster | 123/516 |
| 4,397,333 | 8/1983 | Liba | 123/516 |
| 4,416,303 | 11/1983 | Scheurenbrand | 123/516 |
| 4,450,820 | 5/1984 | Haynes | 123/516 |
| 4,589,395 | 5/1986 | Timms | 123/516 |
| 4,672,937 | 6/1987 | Fales | 123/514 |
| 4,763,633 | 8/1988 | Nafanishi | 123/514 |
| 4,838,307 | 6/1989 | Saraki | 123/514 |
| 4,844,704 | 7/1989 | Jiro | 123/516 |

FOREIGN PATENT DOCUMENTS 0067960   4/2983   Japan .................... 123/516

*Primary Examiner*—Carl Stuart Miller
*Attorney, Agent, or Firm*—Lalos & Keegan

[57] ABSTRACT

The invention relates to an apparatus for the degassing of fuel in a fuel supply system of an internal-combustion engine, in particular in a motor vehicle with a fuel tank, from which fuel is delivered to the fuel-feed system of the internal-combustion engine through a suction line and a pump and excess fuel is returned to the tank via a fuel return line. To achieve an effective and operationally reliable degassing, a vent in the form of a vent valve or a suction removal line with a jet pump is provided in the intake line at a geodetically highest point. Furthermore, reservoirs for separation of the gas bubbles may be connected into the intake line.

7 Claims, 1 Drawing Sheet

APPARATUS FOR THE DEGASSING OF FUEL

BACKGROUND AND DISCUSSION OF THE INVENTION

This is a continuation-in part of co-pending application Ser. No. 07/227,831 filed Aug. 3, 1988 now abandoned.

The invention relates to an apparatus for the degassing of fuel in a fuel tank, in particular for motor vehicles.

In fuel supply systems for internal-combustion engines, in particular in motor vehicles, at high outside temperatures and due to the heat emission of the internal-combustion engine, the fuel may heat up to a considerable level and then, under certain conditions, begins to emit gases. The gas emission which, due to the pressure and flow conditions, occurs particularly in the intake line of the fuel pump, can cause a deterioration in the efficiency of the pump ranging in extent up to its temporary failure.

The object of the invention is therefore to create an apparatus of the generic type which, with simple and operationally reliable design effects an adequate degassing of the fuel even at relatively high fuel temperatures.

According to the invention, on the intake line running in the fuel tank there is provided a vent, via which the gas bubbles contained in the fuel in the intake line can escape into the fuel tank both during operation and during times of standstill. The vent is either made as a non-return valve, preferably designed as a mushroom-type valve, which allows gas emission but no fuel return or, with a virtually empty fuel tank, a penetration of gases, or takes the form of a suction removal line with a jet pump.

The vent valve of the invention is arranged in a rising branch from the intake line. The pump output is matched with the cross-section of the intake line to control the average fuel flow. These features have the effect of improving degassing during the operation of the fuel pump, in other words with flowing fuel. It has been found that reliable gas emission can be achieved if the gas bubbles can collect in a stabilized line section (branch line). It has, furthermore, been found to be particularly advantageous to lower the flow rate of the fuel in the intake line to a specified range by appropriate adaptation of its clear cross-section. As a result, the gas bubbles collecting at the geodetically highest point are not entrained with the flowing fuel, but can collect in the branch line, forming a larger gas bubble, and then be eliminated via the vent.

As discussed with respect to the preferred embodiment, there is connected to the suction line a reservoir, in which gas bubbles forming in the upstream suction line section are separated and drawn off via the suction removal line and the jet pump. Relevant tests have shown that an effective suction removal of the gas bubbles is achieved without adversely affecting the efficiency or the output of the pump. The gas bubbles drawn off are returned to the fuel tank together with the fuel flowing back via the return line. This return should expediently lie as far as possible from the mouth of the intake line in the fuel tank A defined gas emission of the heated fuel in the suction line section downstream of the reservoir is achieved by the suction line on the tank side having a smaller cross-section than the suction line on the pump sides. With this configuration the flow rate of the fuel is increased and/or its compressive energy is reduced. A close-meshed intake screen, known per se, may preferably serve as restriction to achieve the smaller cross-section.

At least one further reservoir, which likewise has a suction removal line for gas bubbles, may be connected downstream of the first reservoir. Consequently, any gas bubbles which may still pass through the first reservoir are subsequently separated or removed from the suction line, so that an effective degassing is ensured even at high fuel temperatures and corresponding gas emission. If appropriate, still further reservoirs with functionally the same arrangement may also be used. The reservoirs may be arranged constructionally one behind the other or inserted one in the other with corresponding connecting openings.

As experience shows that if at least two reservoirs are used there is a lower incidence of gas bubbles in the second reservoir. A restrictor may be provided in the suction removal line which has the effect of a stronger suction removal in the first reservoir and a lesser suction removal in the further reservoir, as result of which suction removal overall is improved. Furthermore, an additional vent valve provided in the suction removal lines, is open in the pressureless state and makes possible the elimination of gas bubbles during standstill or with switched-off fuel pump. If gas bubbles form here in the intake line due to the possibly still hot fuel pump, they can escape into the fuel tank via the geodetically higher vent valve in the suction removal line.

If appropriate, a close-meshed screen may also be fitted at the outlet on the pump side at least of the first reservoir, which screen counters an overflow of gas bubbles from the first reservoir into the second reservoir. However, on no account may such a screen be arranged upstream of the vent valve. The reservoirs and the suction jet pump, as well as the corresponding connecting lines may be constructionally arranged particularly advantageously inside the fuel tank. If there is, however, a considerable amount of pipework, an arrangement outside the fuel tank is also possible.

The above has been a brief discussion of certain deficiencies in the prior art and advantages of the invention. Other advantages may be perceived from the detailed discussion of the preferred embodiments which follow.

DETAILED DESCRIPTION OF THE PREFERRED EMBODIMENTS

Figure 1:
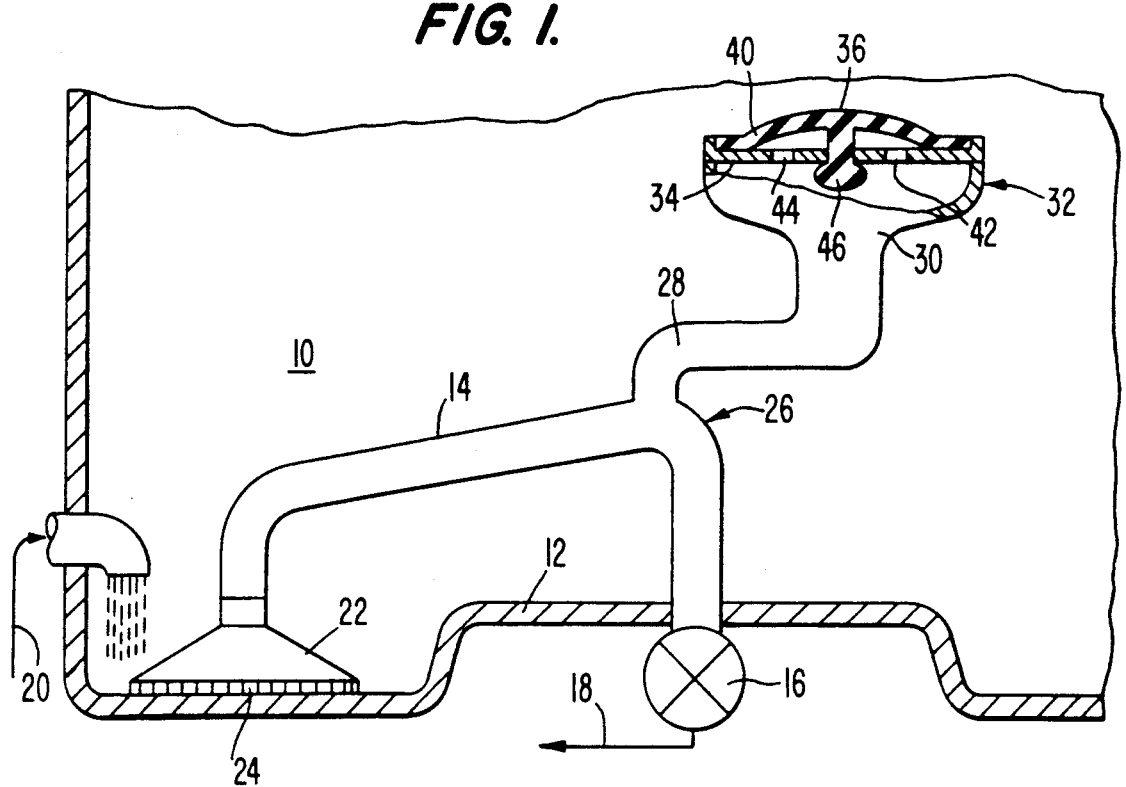
FIG. 1 shows in schematic a fuel tank for a motor vehicle with an intake line with a vent valve and FIG. 2 shows in schematic an apparatus in a fuel tank for motor vehicles for the degassing of fuel, with two reservoirs and a suction jet pump.

According to FIG. 1, a metallic intake line 14 is laid in an only partially shown fuel tank 10 in the region of the bottom 12, which intake line passes through the bottom 12 of the fuel tank and is connected to an electric fuel pump 16. The electric fuel pump 16 is part of a fuel supply system of the motor vehicle and delivers fuel via a flow line 18 to a metering device (not shown) of the internal-combustion engine of the motor vehicle. Excess fuel is returned to the fuel tank 10 via a return line 20.

The intake line 14 extends from the bottom 12 of the fuel tank 10 through an interposed intake funnel 22 with a fuel screen 24 and rises up to a geodetically highest point 26. There, it has a bend of about 100° and then runs steeply downwards to the intake side of the fuel pump 16. There the intake line 14 is fixed to the bottom 12 of the fuel tank 10.

At the geodetically highest point 26 of the intake line 14 there branches off a branch line 28, which opens out into a housing 30 of a vent valve, denoted generally by 32. In the vent valve 32, or in its upper end wall 34, there is fitted an elastomeric mushroom-shaped valve body 36. There circular sealing lip 40 of the valve body 36 covers vent openings 42, 44 in the end wall 34. Valve body 36 is held by means of an elastomeric prolongation 46 with a thickened region (see drawing) in a central bore of the end wall 34. The sealing lip 40 consequently only bears against the sealing surface of the end wall 34 by its relatively own low weight, so that if there are the slightest lifting forces gas bubbles can escape from the branch line 28. On the other hand, a return of fuel or gas from the fuel tank 10 into the branch line 28 is prevented.

The clear portion or bore cross-section of the intake line 14 is matched to the set delivery of the fuel pump 16 in such a way that, when the fuel pump is in operation, an average flow rate of the fuel of 0.12 m/sec is produced in the intake line 14. At this flow rate, which can vary in a certain range depending on the fuel temperature and other operating parameters, the gas bubbles occurring in the intake line are not entrained by the flow, but are divided off into the branch line 28 and taken through its rising path due to the uplift of the gas bubbles into the housing 30 of the vent valve and dispelled into the fuel tank 10 via the vent openings 42 44. Likewise, during times when the fuel pump 16 is at a standstill, any gas bubbles which may still be present or forming in the intake line 14 are raised up to the geodetically highest point 26 and eliminated via the vent valve 32.

Figure 2:
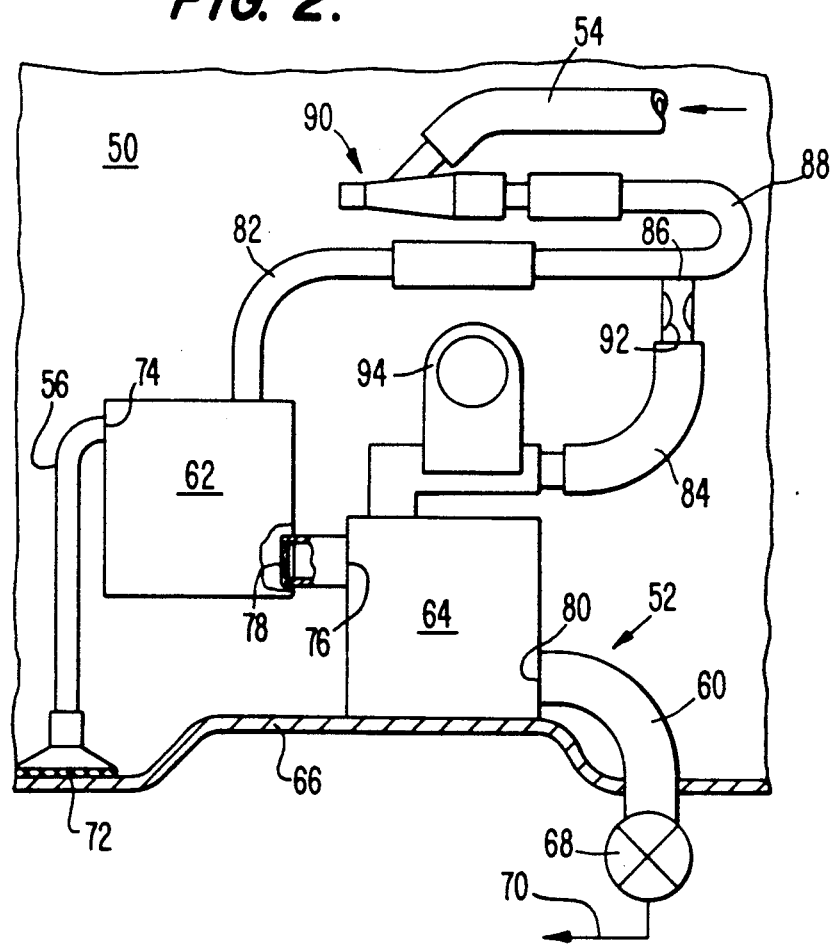

FIG. 2 shows a further apparatus for the degassing of fuel in an only partially shown fuel tank 50 for a motor vehicle with an intake line 52 and a return line 54 for fuel. The intake line 52 is made up of a line section 56, a connecting line 58 and an intake line section 60, into which a first reservoir 62 and a further reservoir 64 are connected. The reservoir 64 is fixed to the bottom 66 of the fuel tank 50.

The intake line section 60 is connected to an electric fuel pump 68, through which the internal-combustion engine (not shown) or its fuel-feed system is supplied with fuel at a defined pressure via the flow line 70, as indicated schematically in FIG. 2. The fuel flowing back from the fuel-feed system is reintroduced into the fuel tank 50 via the return line 54.

The intake line section 56 has, close to the bottom 66 of the fuel tank, a funnel-shaped intake screen 72 having a mesh width of about 30 m. At the other end, the intake line section 56 opens out at a geodetically high point 74 into the reservoir 62. The two reservoirs 62, 64 are interconnected by the connecting line 58, the reservoir 62 being arranged offset vertically in such a way that the connecting line 58 connects the bottom region of the reservoir 62 to the geodetically high point 76 of the reservoir 64. At the outlet region of reservoir 62 on the pump side, a screen 78 having a mesh width of about 50 m is arranged in the connecting line. Reservoir 64 is in turn connected to intake line section 60 in its bottom region, or the geodetically low point 80.

From each of the reservoirs 62, 64 there branches off at their geodetically highest point a suction removal line 82 and 84, respectively, which are brought together at 86 and connected by the shared line section 88 to a suction jet pump 90 arranged in the fuel tank. The suction jet pump 90, which may be designed in the manner of a Laval nozzle, is operated from the connected return line 54.

Also provided in the suction removal line 84 is a restrictor 92, which defines the bore cross-section of the intake line 84. Furthermore, there branches off from the suction removal line 84 a vent valve 94, the valve body of which (not shown, cf. FIG. 1) is geodetically higher than the reservoir 62. The cross-section of the intake line section 56 is substantially smaller than the cross-section of the connecting line 54 or the cross-section of the intake line section 60.

If the electric fuel pump 68 is in operation and the fuel inside the fuel tank heats up to about 40° Celsius, a gas emission takes place in the intake line section 56 due to the restricting resistance of the intake screen 72 and the relatively high flow rate of the fuel, the liberated gas bubbles collecting in the upper region of the reservoir 62. An entrainment of these gas bubbles through the connecting line 58 into the further reservoir 64 is partially prevented by the screen 78. Furthermore, a further gas emission is effected, the gas bubbles still contained in the fuel collecting in the reservoir 64 at its upper side. Consequently, bubble-free degassed fuel is fed to the electric fuel pump 68.

The gas bubbles in the reservoirs 62, 64 are sucked off via the suction removal lines 82, 84 by the suction jet pump 90. The suction effect is produced here by the fuel flowing back into the fuel tank in the return line 54. The returning fuel gassed with the bubbles is discharged via the suction jet pump 90 into the fuel tank 50, the corresponding outlet opening lying far away from the intake screen 72. Suction removal is repeatedly performed through the restrictor 92 via the suction removal line 82, making allowance for the high degree of gas emission of the fuel occurring in the reservoir 62.

If the internal-combustion engine is switched off, as a result of which the electric fuel pump 68 also comes to a standstill, any gas bubbles which may occur at the heated fuel pump 68 can escape into the fuel tank 50 via the intake line section 60, the reservoir 64, the suction removal line 84 and the vent valve 94.

This ensures that a bubble-free fuel supply takes place immediately when the internal-combustion engine is restarted. As shown in the drawing, the fuel pump is geodetically lower and that the suction line must be laid so that air bubbles rise up to the vent valve.

The above is a detailed description of the preferred embodiment. The claims which follow define the scope of invention to which applicants are entitled. It should be understood that applicants intend to cover all equivalents of invention as defined in the claims, as well as those items which fall specifically within the claim language. In this regard, the details of the preferred embodiments should not be construed to unduly narrow the full scope of applicants' contribution.

What is claimed is:

1. An apparatus for the degassing of fuel in a fuel tank for motor vehicles comprising:
   a fuel pump, an intake line extending from the bottom of said fuel tank, said pump connected to said intake line for pumping said fuel via said intake line and delivering said fuel to an internal-combustion engine of said motor vehicle;

a gas removal line including a vent valve on the intake line at a geodetically highest point;

an intake screen in the intake line, characterized in that said vent valve is located downstream of said intake screen and on a closed section of said intake line, said closed section ascending from said pump to said vent valve and at least a first reservoir connected into the intake line;

the intake line having a first section connected between the pump and said first reservoir and a second section connected between said tank and said first reservoir, said first section being connected to said first reservoir at a geodetically lower point than said second section;

a suction removal line connected to said first reservoir at a geodetically high point relative to said first section;

a jet pump;

said suction removal line being connected to said jet pump;

a fuel return line for returning unused fuel to said tank; and said jet pump being operated by said fuel return line.

2. The apparatus according to claim 1 wherein said intake screen has a mesh width of about 30 m.

3. The apparatus according to claim 1 wherein:

a second reservoir is connected to the intake line;

a connecting line leading from the geodetically lower point of said first reservoir to a geodetically higher point of said second reservoir; and a second suction removal line connected to said second reservoir at a geodetically high position and connected to said first suction removal line.

4. The apparatus according to claim 3, wherein a restrictor is provided in said second suction removal line.

5. The apparatus according to claim 3, further comprising second vent valve arranged in said second suction removal line.

6. The apparatus according to claim 1, further comprising a close-meshed screen being fitted in an outlet of said first reservoir.

7. The apparatus according to claim 1, wherein said first reservoir and said suction jet pump are arranged inside the fuel tank.

* * * * *